(12) United States Patent
Schmitt et al.

(10) Patent No.: US 7,353,838 B2
(45) Date of Patent: Apr. 8, 2008

(54) TOP MOUNTED FAUCET ASSEMBLY WITH AIR GAP

(75) Inventors: Craig Schmitt, Phoenix, AZ (US); Mark D. Henss, Glendale, AZ (US)

(73) Assignee: Watts Regulator Co., North Andover, MA (US)

( * ) Notice: Subject to any disclaimer, the term of this patent is extended or adjusted under 35 U.S.C. 154(b) by 187 days.

(21) Appl. No.: 11/245,318

(22) Filed: Oct. 6, 2005

(65) Prior Publication Data

US 2006/0076056 A1    Apr. 13, 2006

(51) Int. Cl.
*F16K 21/00* (2006.01)
*E03C 1/10* (2006.01)

(52) U.S. Cl. ............ 137/315.12; 137/216; 137/315.41; 137/801

(58) Field of Classification Search ................ 137/216, 137/801, 15.17, 15.18, 315.12, 315.41, 327, 137/15.24, 15.22; 4/675–678
See application file for complete search history.

(56) References Cited

U.S. PATENT DOCUMENTS

| | | | |
|---|---|---|---|
| 1,848,521 A | 3/1932 | Fleck | |
| 1,910,182 A | 5/1933 | Robertson | |
| 2,063,399 A | 12/1936 | Rasmussen | |
| 2,082,748 A | 6/1937 | Brown | |
| 2,173,707 A | 9/1939 | Brown | |
| 2,282,212 A | 5/1942 | Pope | |
| 2,365,372 A | 12/1944 | Allen | |
| 2,400,684 A | 5/1946 | Clark | |
| 2,479,485 A | 8/1949 | Frank | |
| 2,556,155 A | 6/1951 | Stellin | |
| 3,010,474 A | 11/1961 | Moen | |
| 3,014,563 A | 12/1961 | Bratton | |
| 3,125,764 A | 3/1964 | Young | |
| 3,287,742 A | 11/1966 | Gaddis | |
| 3,333,815 A | 8/1967 | Downey et al. | |
| 3,348,444 A | 10/1967 | Brignola | |
| 3,353,192 A | 11/1967 | Christiansen | |
| 3,449,774 A | 6/1969 | Wilham | |
| 3,489,312 A | 1/1970 | Hunckler et al. | |
| 3,620,241 A | 11/1971 | Brown | |

(Continued)

FOREIGN PATENT DOCUMENTS

CN    2065264 U    11/1990

(Continued)

*Primary Examiner*—John Rivell
*Assistant Examiner*—Craig Schneider
(74) *Attorney, Agent, or Firm*—Fish & Richardson P.C.

(57) ABSTRACT

A faucet assembly includes a base having first and second ends, a sidewall extending between the ends, a mounting bore extending from the first end, a permeate water spout port extending from the second end, and a valve assembly bore extending from the sidewall and connecting the mounting bore and the permeate water spout port. A fastener is located within the mounting bore and extends out of the base from the mounting bore for securing the faucet assembly to a mounting surface, and a valve member is positioned within the valve assembly bore and movable between closed and opened positions. The valve member allows tool access from the permeate water spout port, through the valve member, and to the fastener in the mounting bore when the valve member is moved to a predetermined position. This arrangement allows top-mounting of the faucet assembly using a toggle bolt.

15 Claims, 15 Drawing Sheets

U.S. PATENT DOCUMENTS

| | | |
|---|---|---|
| 3,669,141 A | 6/1972 | Schmitt |
| 3,785,396 A | 1/1974 | Morris et al. |
| 3,790,966 A | 2/1974 | Keane |
| 3,880,041 A | 4/1975 | Markowski et al. |
| 4,006,498 A | 2/1977 | Cuschera |
| 4,080,671 A | 3/1978 | Stahli |
| 4,281,857 A | 8/1981 | Randall |
| 4,553,277 A | 11/1985 | Duncan |
| 4,557,288 A | 12/1985 | Botnick |
| 4,654,900 A | 4/1987 | McGhee |
| 4,671,316 A | 6/1987 | Botnick |
| 4,704,057 A | 11/1987 | McSherry |
| 4,760,861 A | 8/1988 | Botnick |
| 4,762,143 A | 8/1988 | Botnick |
| 4,771,485 A | 9/1988 | Traylor |
| 4,852,192 A | 8/1989 | Viegener |
| 4,856,121 A | 8/1989 | Traylor |
| 4,893,848 A | 1/1990 | Melcher |
| 4,927,287 A | 5/1990 | Ohkawa et al. |
| 4,998,555 A | 3/1991 | Barhydt, Sr. et al. |
| 5,010,922 A | 4/1991 | Agresta |
| 5,020,569 A | 6/1991 | Agresta |
| 5,027,851 A | 7/1991 | Drees et al. |
| 5,050,246 A | 9/1991 | Huntoon |
| 5,051,636 A | 9/1991 | Ishimoto et al. |
| 5,127,427 A | 7/1992 | Kajpust et al. |
| 5,232,008 A | 8/1993 | Jeffress et al. |
| 5,256,810 A | 10/1993 | Rowe et al. |
| 5,358,368 A | 10/1994 | Conlan et al. |
| 5,375,272 A | 12/1994 | Mikol |
| 5,388,287 A | 2/1995 | Tischler et al. |
| 5,465,749 A | 11/1995 | Sauter et al. |
| 5,515,882 A | 5/1996 | Hennis |
| 5,713,385 A | 2/1998 | Traylor |
| 5,819,328 A | 10/1998 | Lewis |
| 5,865,211 A | 2/1999 | Thomas |
| 5,946,746 A | 9/1999 | Bloom |
| 6,085,784 A | 7/2000 | Bloom et al. |
| 6,138,290 A | 10/2000 | Lin |
| 6,138,296 A | 10/2000 | Baker |
| 6,220,278 B1 | 4/2001 | Sauter et al. |
| 6,293,745 B1 | 9/2001 | Lu |
| 6,301,728 B1 | 10/2001 | Pilatowicz et al. |
| 6,302,632 B1 | 10/2001 | Lin |
| 6,328,059 B1 | 12/2001 | Testori et al. |
| 6,360,770 B1 | 3/2002 | Buchner et al. |
| 6,370,712 B1 | 4/2002 | Burns et al. |
| 6,381,776 B1 | 5/2002 | Wang |
| 6,484,330 B2 | 11/2002 | Gray et al. |
| 6,510,863 B1 | 1/2003 | Traylor |
| 6,725,472 B2 | 4/2004 | Gray et al. |
| 6,792,629 B2 | 9/2004 | Nelson et al. |
| 7,171,979 B1 * | 2/2007 | Lai ............................ 137/359 |
| 7,296,588 B1 * | 11/2007 | Hwang ....................... 137/359 |
| 2002/0120984 A1 | 9/2002 | Gray et al. |
| 2004/0094202 A1 * | 5/2004 | Kawolics et al. ........... 137/216 |
| 2004/0182459 A1 * | 9/2004 | Klein .......................... 137/801 |

FOREIGN PATENT DOCUMENTS

| | | |
|---|---|---|
| CN | 2263744 Y | 10/1997 |
| CN | 2313657 Y | 4/1999 |
| CN | 1287237 A | 3/2001 |
| CN | 2568896 Y | 8/2003 |
| CN | 2569701 Y | 9/2003 |
| CN | 2698233 Y | 5/2005 |
| DE | 3330156 C1 | 12/1984 |
| DE | 3502953 A1 | 10/1985 |
| EP | 0 231 557 A1 | 8/1987 |
| EP | 0 333 202 A1 | 9/1988 |
| EP | 1243708 | 9/2002 |
| JP | 2020731 | 1/1990 |
| JP | 2001032337 | 2/2006 |
| WO | WO03/066977 | 8/2003 |

* cited by examiner

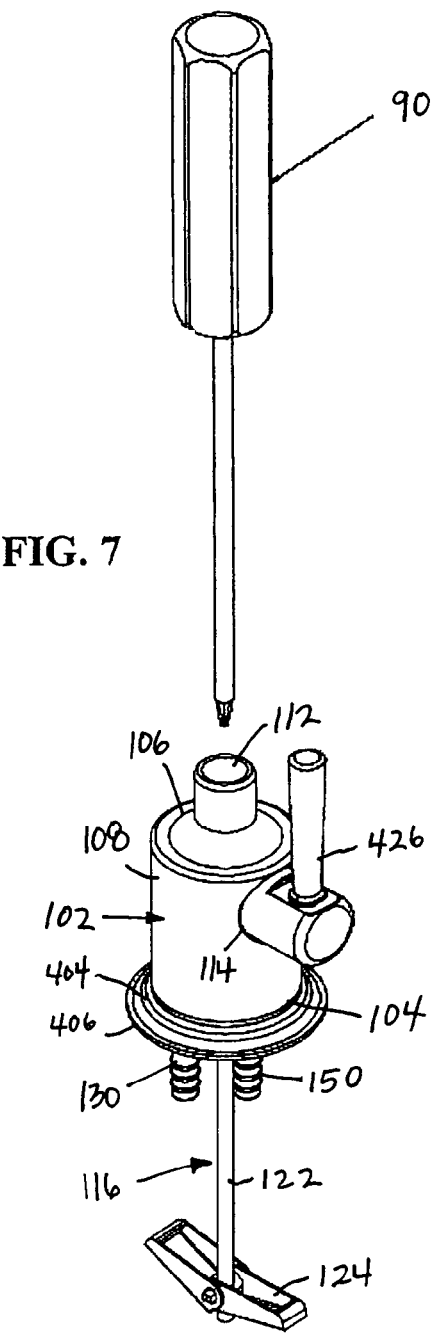
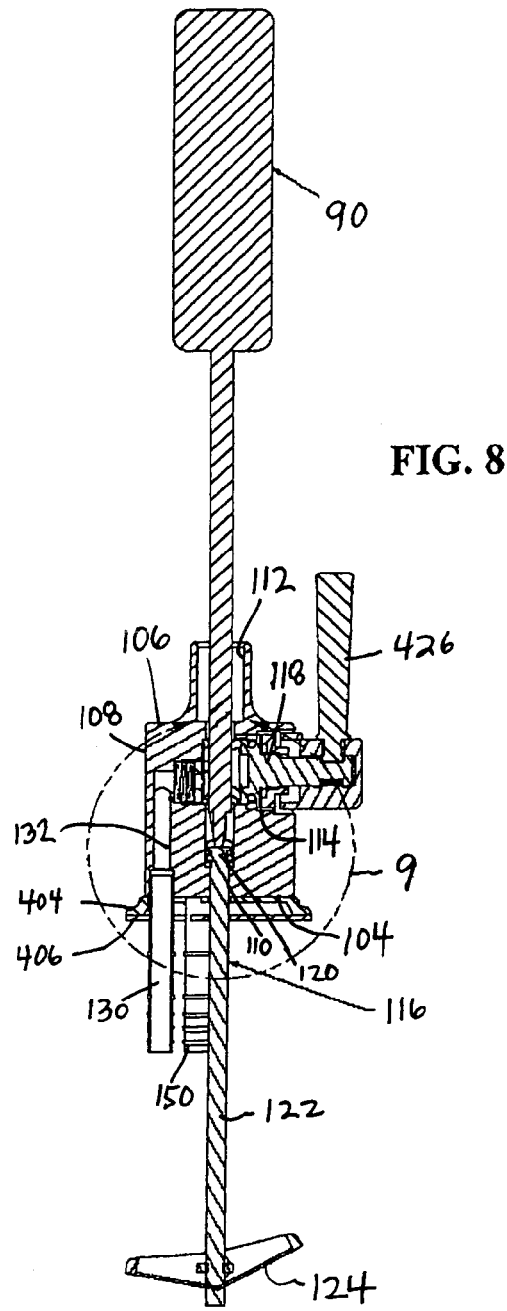
FIG. 7
FIG. 8

TOP MOUNTED FAUCET ASSEMBLY WITH AIR GAP

CROSS-REFERENCE TO RELATED APPLICATION

The present application claims priority from provisional U.S. Patent Application Ser. No. 60/616,715, filed Oct. 7, 2004, which is incorporated herein by reference in its entirety.

TECHNICAL FIELD OF THE DISCLOSURE

The present disclosure relates to faucet assemblies and, more particularly, to a top mounted faucet assembly having an air gap for use with a reverse osmosis water filtering system.

BACKGROUND OF THE DISCLOSURE

In addition to the hot and cold water faucets normally provided on a typical household countertop sink, an auxiliary faucet may be provided for an auxiliary water supply such as water hot enough for making coffee or tea, refrigerated water, or tap water which has been further processed to remove impurities and foreign tastes. A reverse osmosis (RO) tap water filtering system, for example, normally is provided with its own faucet for installation through the counter top, next to the sink. These auxiliary faucets normally require an air gap feature and preferably are mounted from above the counter top for convenience.

As is known, an RO filtering process uses a semipermeable membrane that has the ability to remove and reject a wide spectrum of impurities and contaminants from water using only water pressure. These contaminants are automatically rinsed down the drain. The purified water is then stored in a tank for dispensing through the auxiliary faucet.

FIG. 21 shows a typical RO water filtering system 10 constructed in accordance with the prior art. The system 10 includes a filter assembly 14, a reverse osmosis membrane 18, a reverse osmosis storage tank 22, a flow restrictor 26, a shut-off valve 28, a carbon filter 70 and an auxiliary faucet 72. The filter assembly 14 includes a sediment filter 30 and carbon filters 34a, 34b. Intake water enters the system 10 from a cold-water angle stop valve 36, which is connected to a cold-water source 84, and is routed through an intake tube 38 to filter system 14. The cold-water angle stop valve 36 is also connected to a standard faucet 62 through a cold-water faucet line 64 providing cold water to the standard faucet.

The sediment filter 30 removes sediment such as sand and dirt and the like from the intake water, while the carbon filters 34a and 34b remove chlorine and other contaminants that cause bad color, odor and taste. The filtered water is then routed to the membrane 18 through a water tube 40.

The membrane 18 includes three ports: an intake port 42, a permeate outlet port 46, and a concentrate outlet port 50. The intake port 42 receives filtered intake water from the filter assembly 14 through the water tube 40. The permeate water is routed from outlet port 46 through permeate tubes 52a and 52b and shut-off valve 28 to tank 22 to be stored under pressure. The shut-off valve 28 is automatic and stops the flow of water to the membrane 18 and to the tank 22 when the tank is full. When the auxiliary faucet 72 is opened by a user, permeate water is forced from the tank 22, through a carbon filter 70, and though the faucet 72. Concentrate water is routed from the outlet port 50 through a wastewater tube 78, having a flow restrictor 26, through a drain tube 74 for subsequent disposal down drain 68.

Most plumbing codes specify that an antisiphon or air gap must be located between the wastewater tube 78 and the drain tube 74. This prevents development of a vacuum in the lines that could cause drain or wastewater to be siphoned back into the RO system 10 and contaminate the water supply 84 connected to the RO system. The auxiliary faucet 72, therefore, also includes an air gap connecting the wastewater tube 78 and the drain tube 74.

In installing such auxiliary faucets, it is highly desirable to be able to secure the faucet over a hole in the counter without it being necessary to install a first portion of the securing means from below the counter and another portion from above the counter. With it being possible to secure the faucet from above the counter, it makes it much easier for one person to install the faucet, greatly decreasing the amount of labor involved in installing the faucet.

What is still desired is a new and improved faucet assembly. Among other advantages and benefits, the new and improved faucet assembly will preferably allow top mounting and include an air gap feature.

SUMMARY OF THE DISCLOSURE

The present disclosure provides a new and improved faucet assembly including a base having first and second ends, a sidewall extending between the ends, a mounting bore extending from the first end, a permeate water spout port extending from the second end, and a valve assembly bore extending from the sidewall and connecting the mounting bore and the permeate water spout port. A fastener is located within the mounting bore and extends out of the base from the mounting bore for securing the faucet assembly to a mounting surface, and a valve member is positioned within the valve assembly bore and movable between closed and opened positions. The valve member allows tool access from the permeate water spout port, through the valve member, and to the fastener in the mounting bore when the valve member is moved to a predetermined position. Among other aspects and advantages, this arrangement allows top mounting of the faucet assembly using a toggle bolt.

The present disclosure also provides a new and improved faucet assembly including a base having an air gap bore extending from a first end of the base, and an air gap port extending from a sidewall of the base to the air gap bore. An air gap holder is received in the air gap bore, and includes a first end having a concentrate water inlet port and a wastewater outlet port. A concentrate water inlet tube is received in the concentrate water inlet port of the air gap holder, and a wastewater outlet tube is received in the wastewater outlet port of the air gap holder below the air gap port. In operation, concentrate water from the concentrate water inlet tube is directed to an end of the air gap bore above the air gap port and then allowed to flow to the waste water outlet tube. Among other aspects and advantages, this air gap arrangement can be more inexpensively manufactured and more easily assembled. In addition, the air gap arrangement has been found to provide relatively quiet operation when the concentrate water is drained to the wastewater outlet tube.

The present disclosure additionally provides a new and improved faucet assembly including a base having a permeate water inlet port. A permeate water inlet tube has an end received in the permeate water inlet port of the base, and the permeate water inlet port includes annular ribs having sloping sidewalls terminating at radial end walls to form pointed barbs that frictionally engage the permeate inlet tube. The sloping sidewalls extend inwardly into the base at an angle of about 7° with respect to an axis of the port. Among other aspects and advantages, the permeate water inlet port provides a strong and secure seal between the port and the tube, without requiring a separate sealant or glue, yet is relatively inexpensive to manufacture and easy to assembly.

The present disclosure also provides a reverse osmosis (RO) tap water filtering system including a faucet assembly constructed in accordance with the present invention. The RO system includes a reverse osmosis membrane having a permeate water output port connected to the faucet assembly and a concentrate water output port connected to the faucet assembly.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein:

FIG. 7 is a perspective view of the faucet assembly of FIG. 1 shown with a faucet spout removed to allow access of a screwdriver, as shown, during mounting of the faucet assembly on a mounting surface;

FIG. 8 is a sectional view of the faucet assembly of FIG. 1 shown with the faucet spout removed and the screwdriver inserted into the assembly and engaging a toggle bolt of the assembly;

DETAILED DESCRIPTION OF EXEMPLARY EMBODIMENTS

Figure 15:
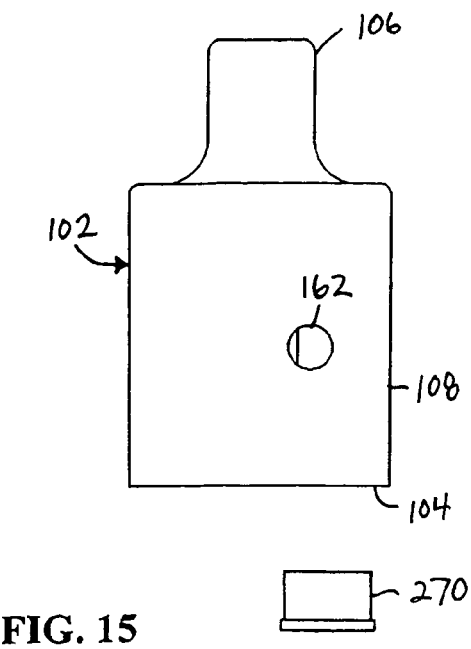
FIG. 15 is an exploded side elevation view of another exemplary embodiment of an air gap assembly and a faucet base constructed in accordance with the present disclosure.
Figure 16:
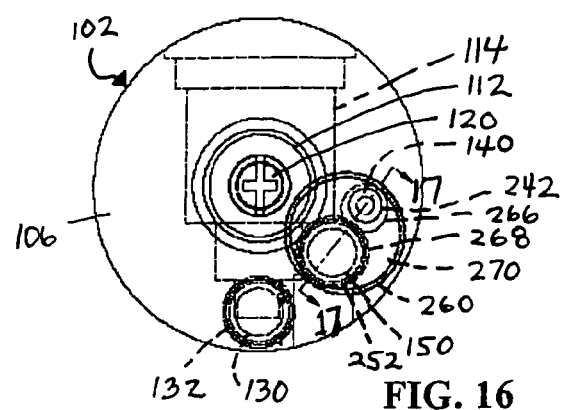
FIG. 16 is a top plan view of the faucet base and the air gap assembly of FIG. 15.
Figure 17:
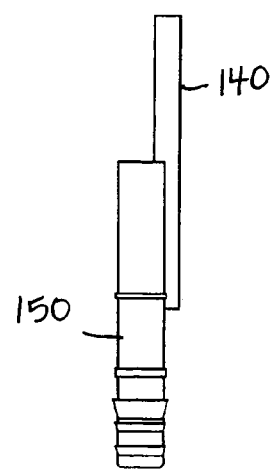
FIG. 17 is an enlarged sectional view of the faucet base and the air gap assembly taken along line 17-17 of FIG. 16.
Figure 18:
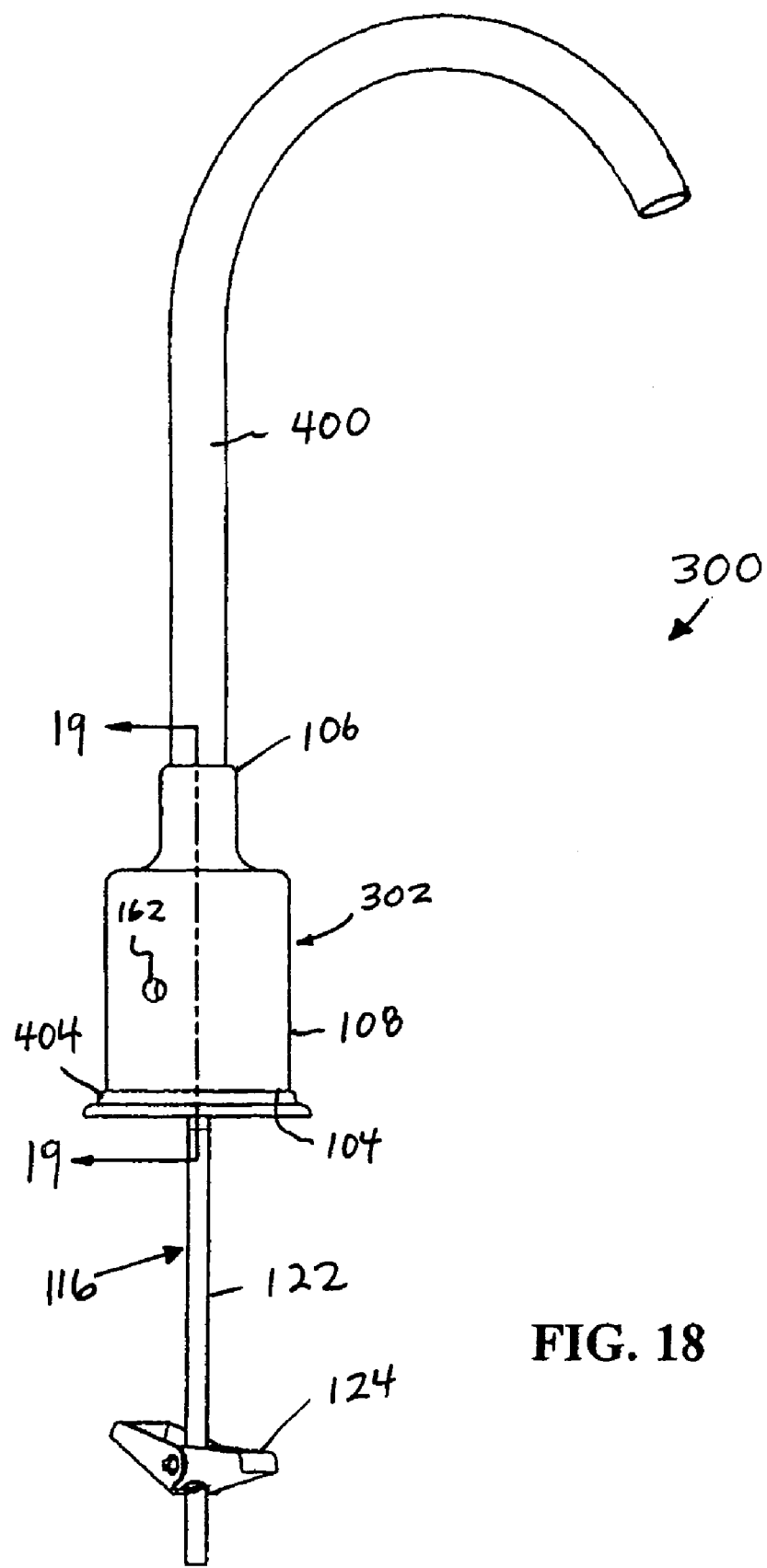
FIG. 18 is a side elevation view of another exemplary embodiment of a faucet assembly constructed in accordance with the present disclosure.
Figure 19:
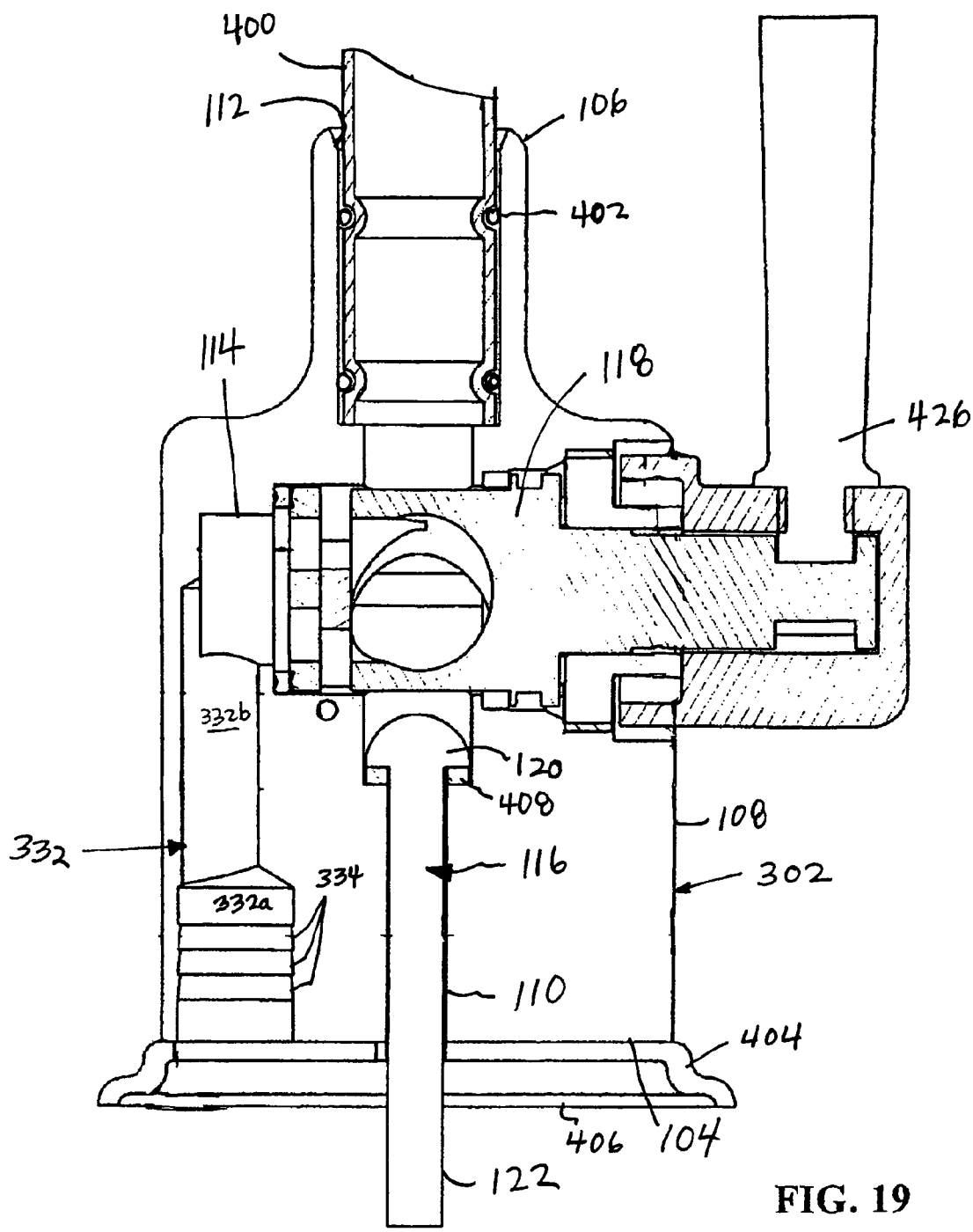
FIG. 19 is an enlarged sectional view of the faucet assembly taken along line 19-19 of FIG. 18, showing a permeate inlet port of the assembly.
Figure 20:
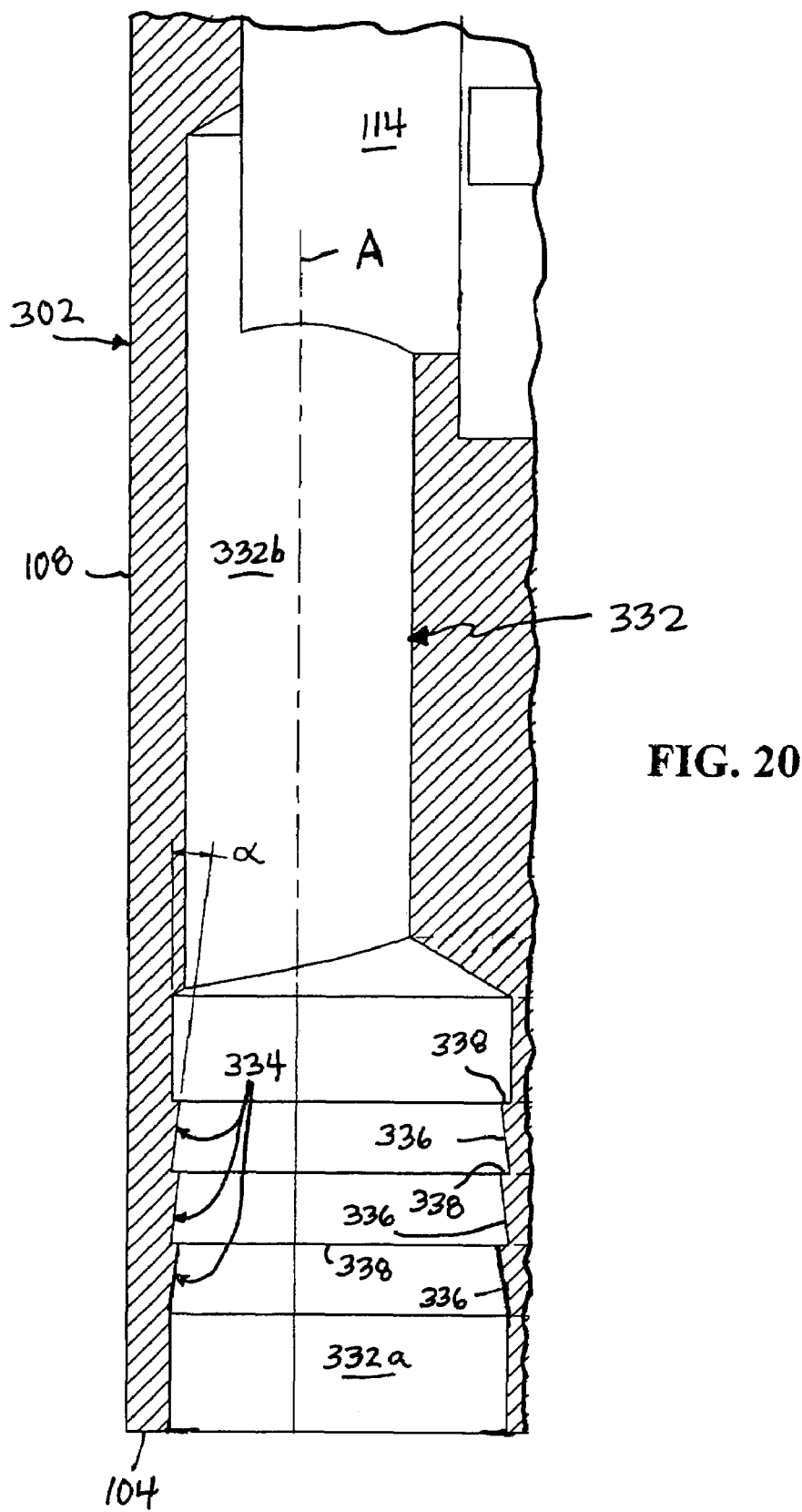
FIG. 20 is a further enlarged sectional view of the permeate inlet port of the faucet assembly of FIG. 18.
Figure 21:
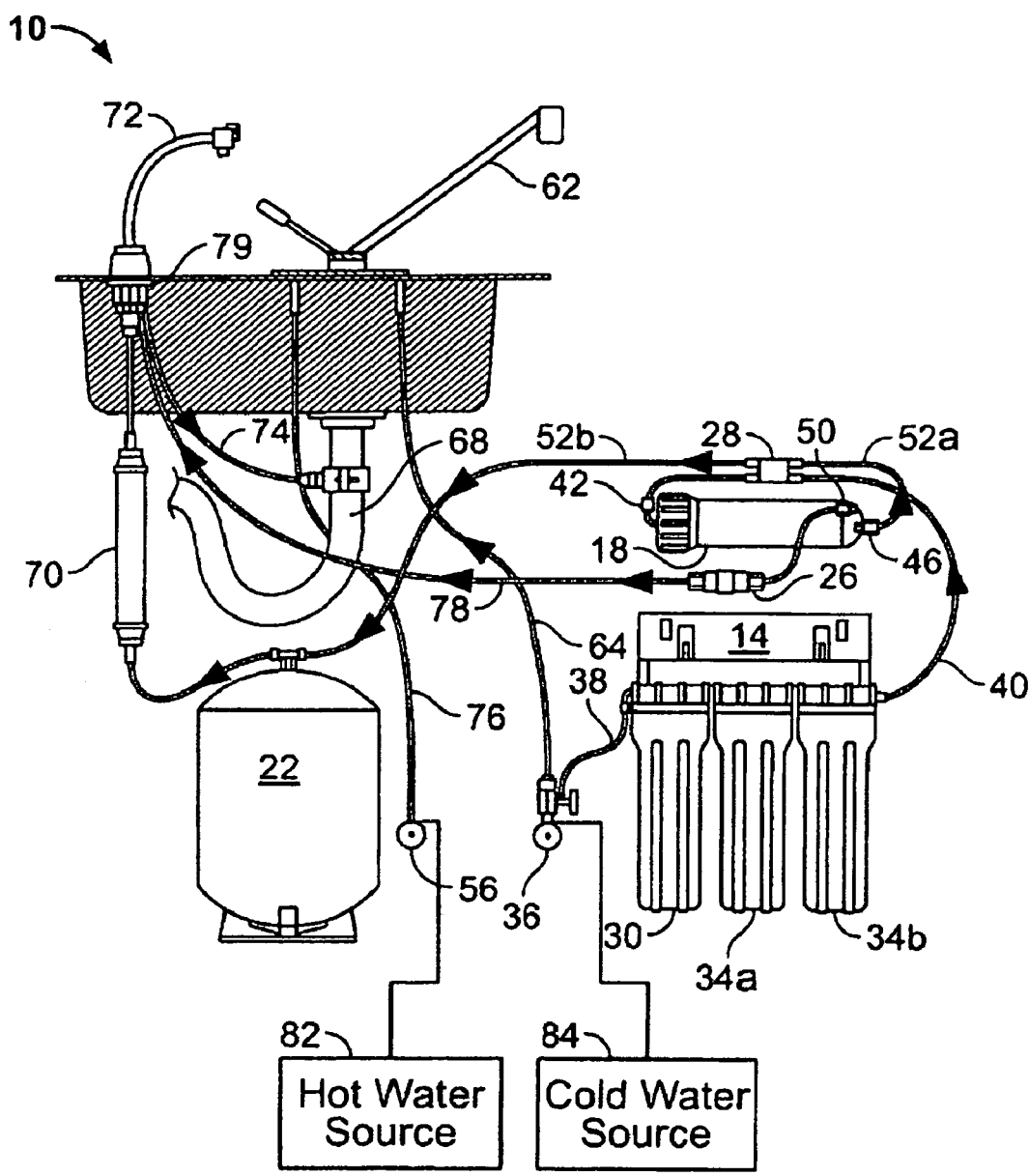
FIG. 21 shows an exemplary embodiment of a reverse osmosis water filtering system constructed in accordance with the prior art.

The present disclosure provides exemplary embodiments of an auxiliary faucet assembly for use with an auxiliary water supply such as instant hot water dispenser, a refrigerated water dispenser, or tap water filtering system. A reverse osmosis (RO) tap water filtering system, for example, normally is provided with its own faucet for installation through the counter top, next to the sink. The presently disclosed auxiliary faucet assembly is for use as part of an RO filtering system, such as the prior art system 10 shown in FIG. 21. Among other aspects and advantages, the presently disclosed faucet assembly includes means for mounting the faucet assembly from above a mounting surface ("top-mounting"), an improved air gap feature, and improved tube connecting arrangement. FIGS. 1-14 show a first exemplary embodiment 100 of the faucet assembly, while FIGS. 15-17 show a second exemplary embodiment 200, and FIGS. 18-20 show a third exemplary embodiment 300.

Figure 5:
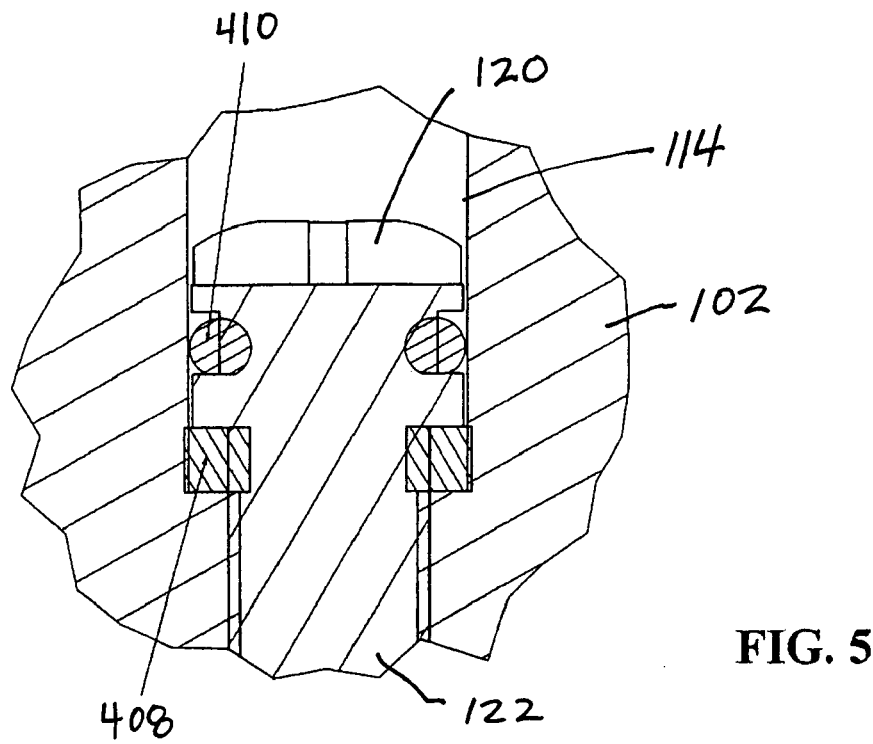
FIG. 5 is a further enlarged sectional view of a portion of the faucet assembly contained in circle "5" of FIG. 4.
Figure 6:
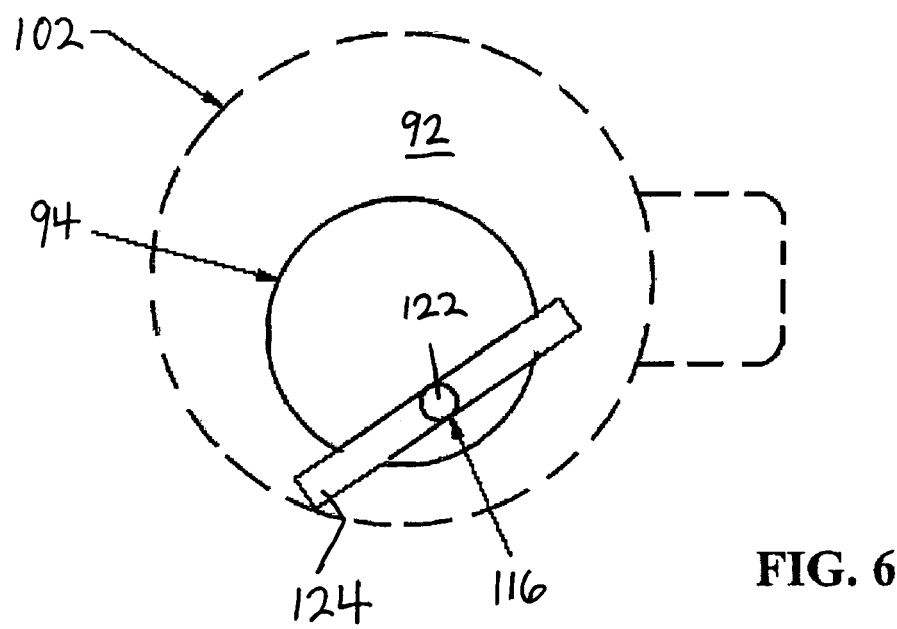
FIG. 6 is a bottom plan view of the faucet assembly of FIG. 1 shown mounted through an opening of a counter, a sink, or other another mounting surface.
Figure 9:
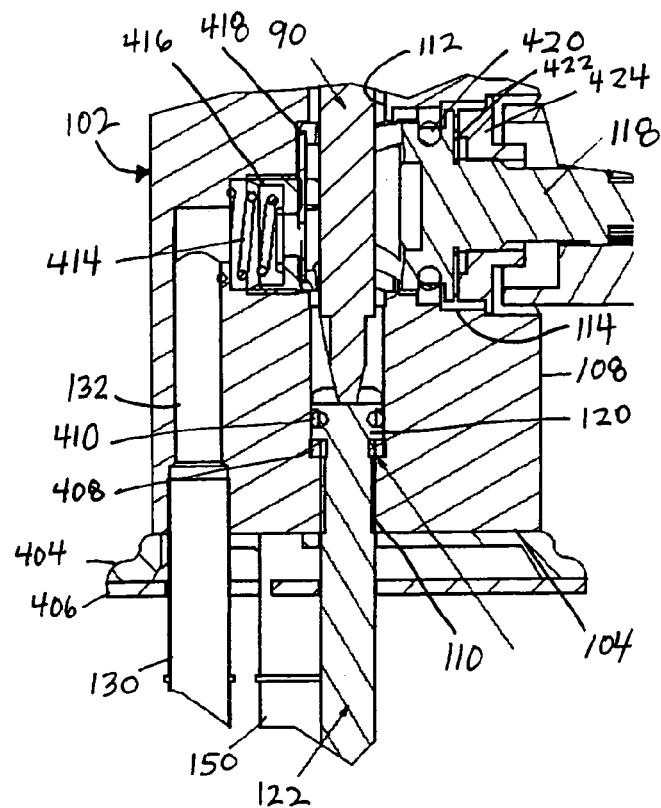
FIG. 9 is an enlarged sectional view of a portion of the screwdriver and the faucet assembly contained in circle "9" of FIG. 8.

Referring first to FIGS. 1-4, the faucet assembly 100 generally includes a base 102 having first and second ends 104, 106, a sidewall 108 extending between the ends, a mounting bore 110 extending from the first end 104, a permeate water spout port 112 extending from the second end 106, and a valve assembly bore 114 extending from the sidewall 108 and connecting the mounting bore 110 and the permeate water spout port 112. A fastener 116 is located within the mounting bore 110 and extends out of the base 102 from the mounting bore 110 for securing the faucet assembly 100 to a mounting surface, and a valve member 118 is positioned within the valve assembly bore 114 and movable between closed and opened positions. The valve member 118 allows tool access from the permeate water spout port 112, through the valve member 118, and to the fastener 116 in the mounting bore 110 when the valve member 118 is moved to a predetermined position (after a faucet spout of the assembly has been temporarily removed from the permeate water spout port 112). FIG. 5 is an enlarged view of a head 120 of the fastener 116, while the FIGS. 7-9 show a tool comprising a screwdriver 90 extending through the permeate water spout port 112, through the valve member 118, and to the head 120 of the fastener 116 in the mounting bore 110. Among other advantages, this arrangement allows top mounting of the faucet assembly 100 using a toggle bolt assembly. FIG. 6 shows the assembly 100 secured through an opening 94 of a mounting surface 92 using the fastener 116.

Figure 1:
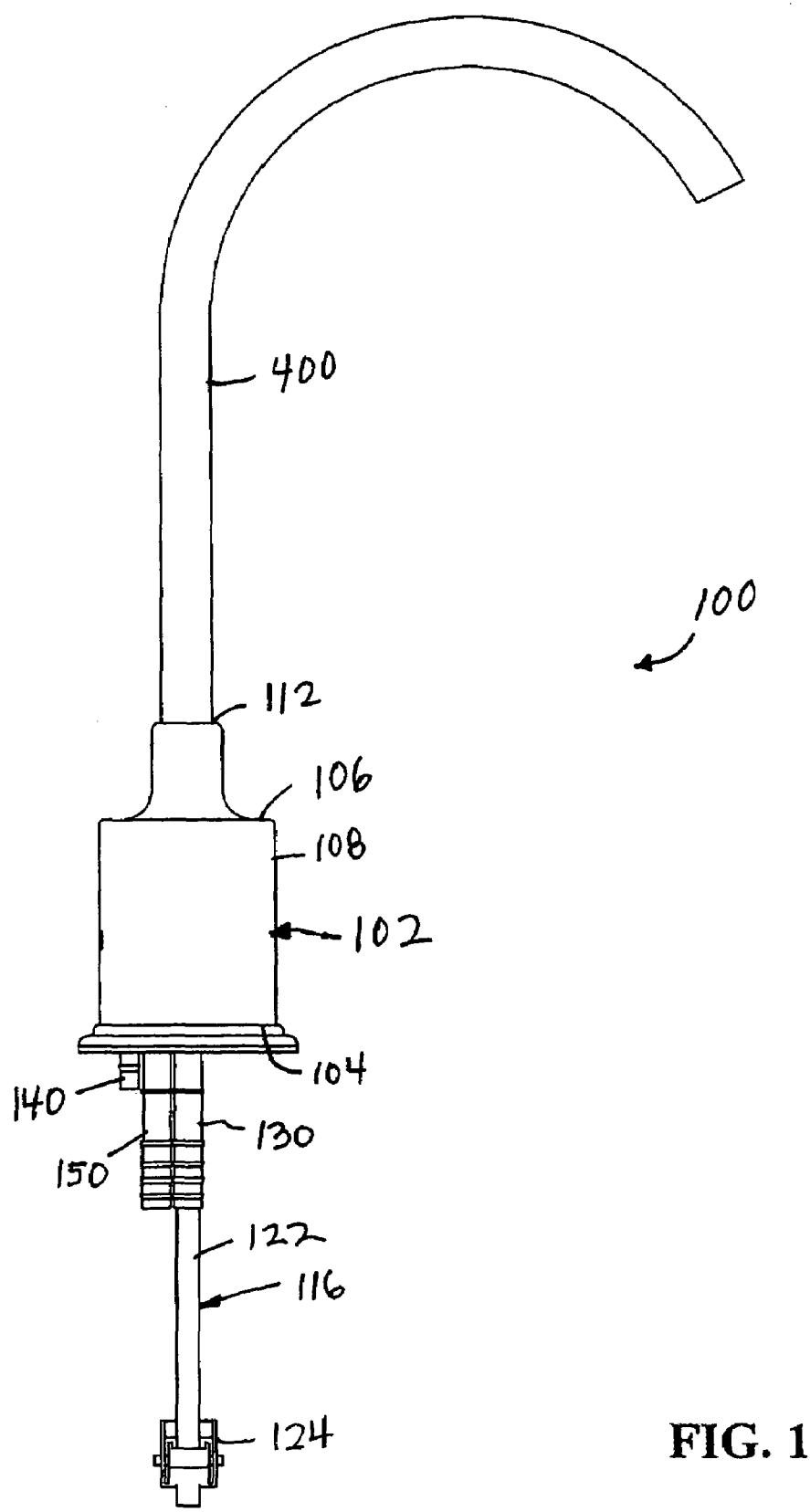
FIG. 1 is an elevation view from a first side of an exemplary embodiment of a faucet assembly constructed in accordance with the present disclosure.
Figure 2:
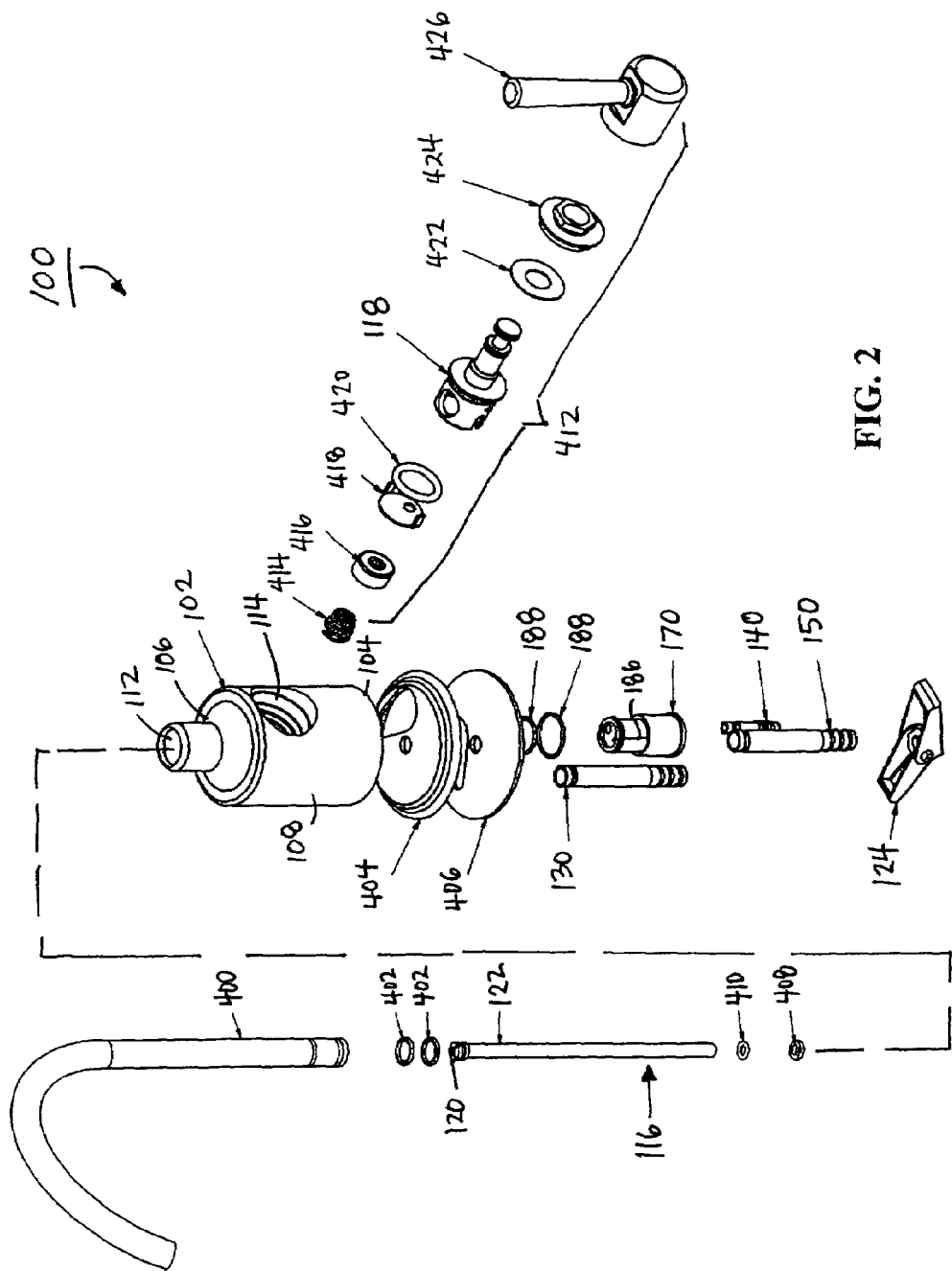
FIG. 2 is an exploded perspective view of the faucet assembly of FIG. 1.
Figure 3:
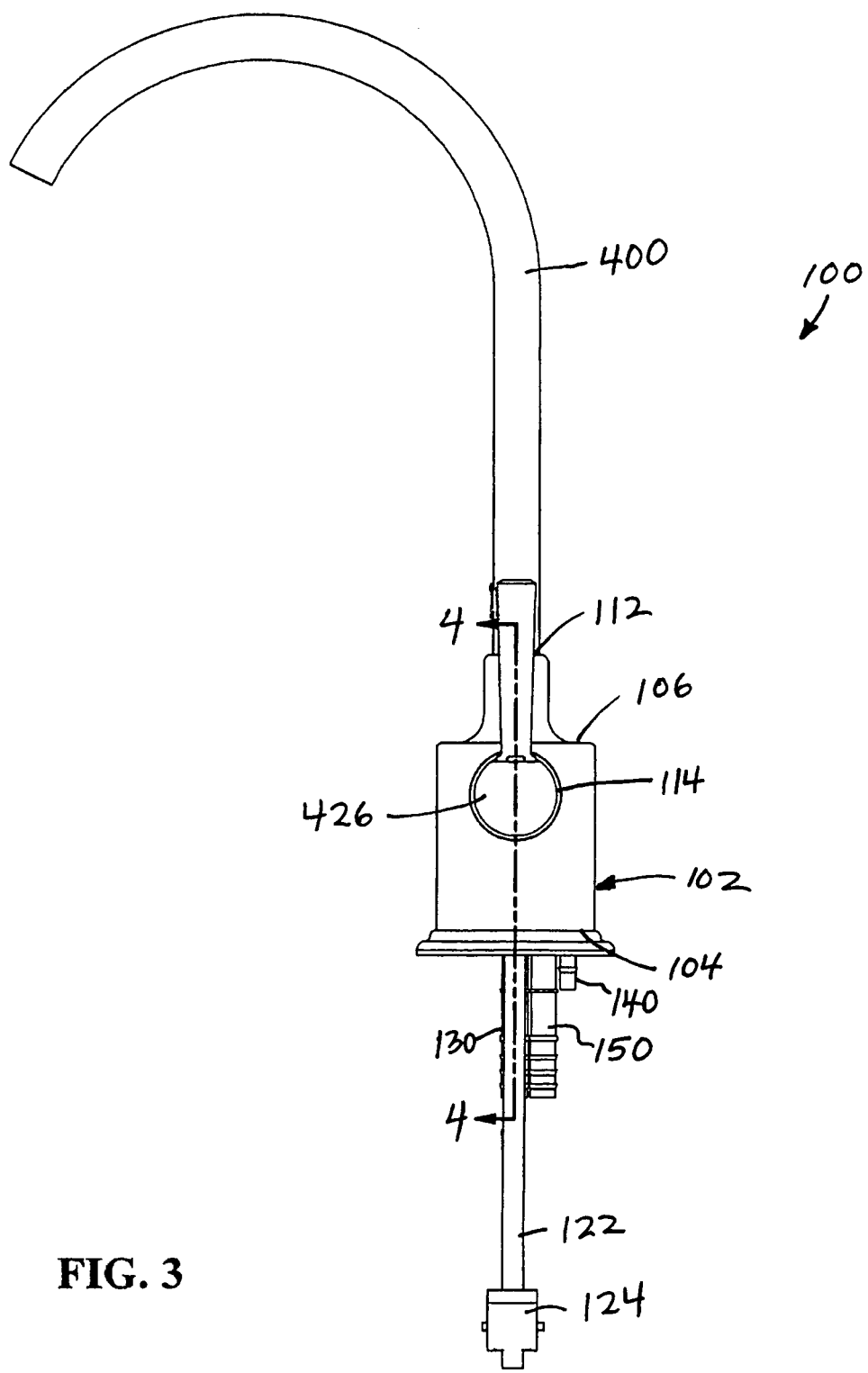
FIG. 3 is an elevation view from a second side, opposite the first side, of the faucet assembly of FIG. 1.

As shown best in FIGS. 2, 7, and 8 the fastener comprises a toggle bolt assembly 116 including a toggle bolt 122 and a toggle nut 124. The toggle nut 124 is threaded onto the bolt 122 and can be folded to fit through the opening 94 in the mounting surface 92 and then springs open when released. Turning the toggle bolt 122 with the screwdriver 90 then draws the unfolded toggle nut 124 up against the underside of the mounting surface 92 so that the faucet assembly 100 is secured in place on the upper side of the mounting surface 92. As shown in FIG. 6, the assembly 100 is offset in the opening of the mounting surface 92 so that a permeate water tube 130, a concentrate water tube 140, and a wastewater tube 150 can fit through the opening for connection to the faucet assembly 100.

In the exemplary embodiment shown, the predetermined position of the valve member 118 that allows access to the head 120 of the toggle bolt 122 corresponds to the closed position of the valve member 118. Moving the valve member 118 to the opened position blocks access to the toggle bolt 122. Alternatively, the valve member 118 could be adapted so that the predetermined position of the valve member 118 that allows access to the toggle bolt 122 corresponds to the opened position of the valve member 118, or corresponds to neither the opened or closed positions.

Figure 4:
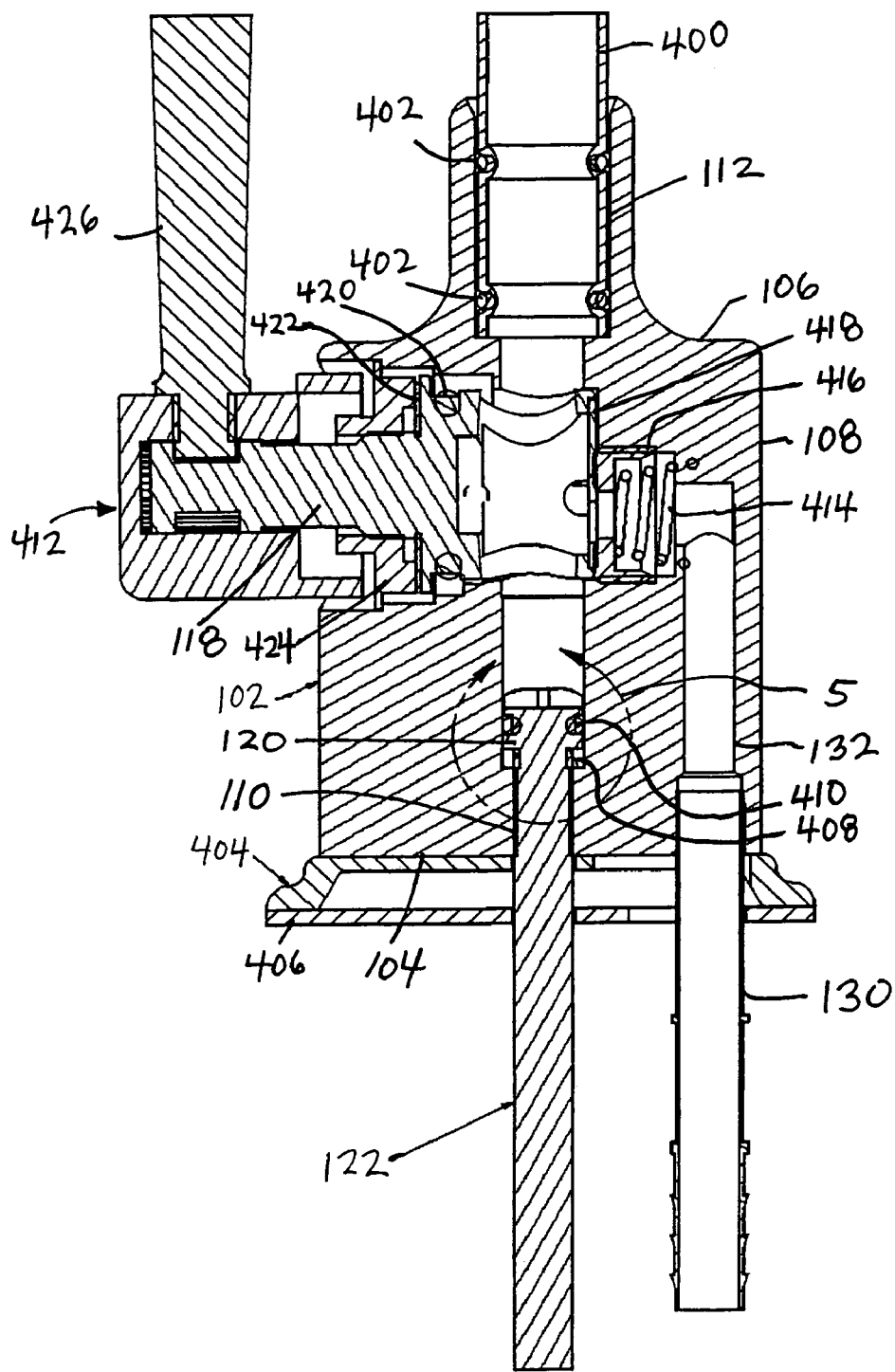
FIG. 4 is an enlarged sectional view of a portion of the faucet assembly taken along line 4-4 of FIG. 3.

The base 102 further comprises a permeate water inlet port 132 extending from the first end 104 and connected to the valve assembly bore 114 as shown in FIG. 4. The permeate water tube 130 is secured in the permeate water inlet port 132. Fluid communication is provided between the permeate water inlet port 132 and the permeate water spout port 112 when the valve member 118 is moved to the opened position.

Figure 10:
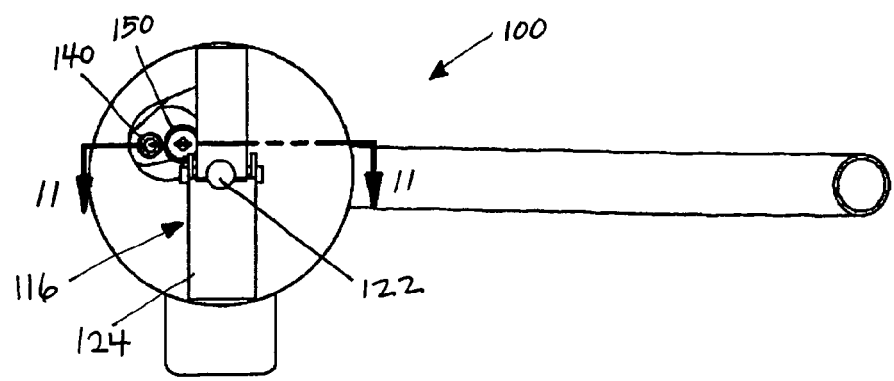
FIG. 10 is a bottom plan view of the faucet assembly of FIG. 1.
Figure 11:
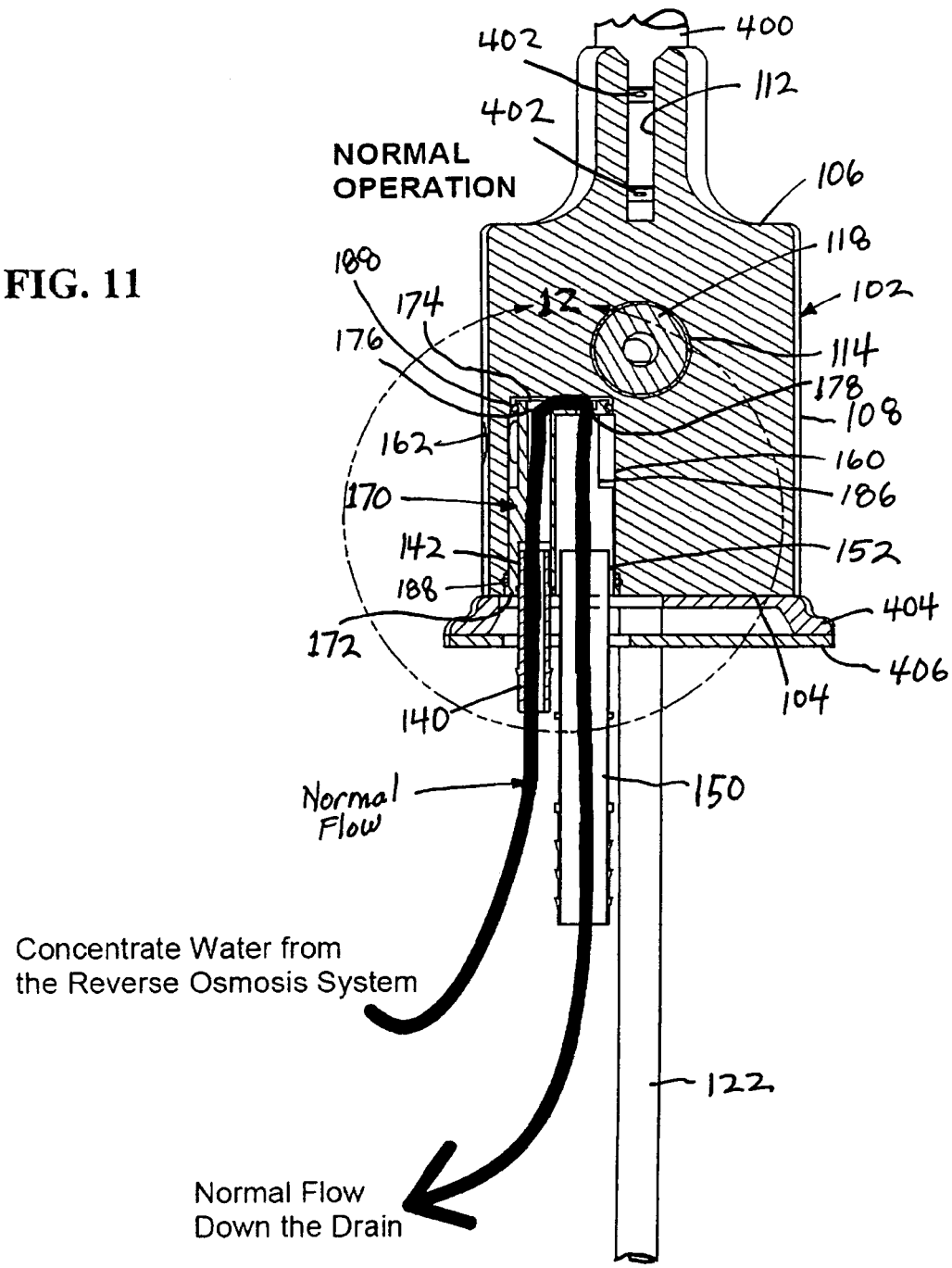
FIG. 11 is an enlarged sectional view of a portion the faucet assembly taken along line 11-11 of FIG. 10, wherein an arrow is provided to illustrate normal flow of concentrate water through an air gap assembly of the faucet assembly.
Figure 12:
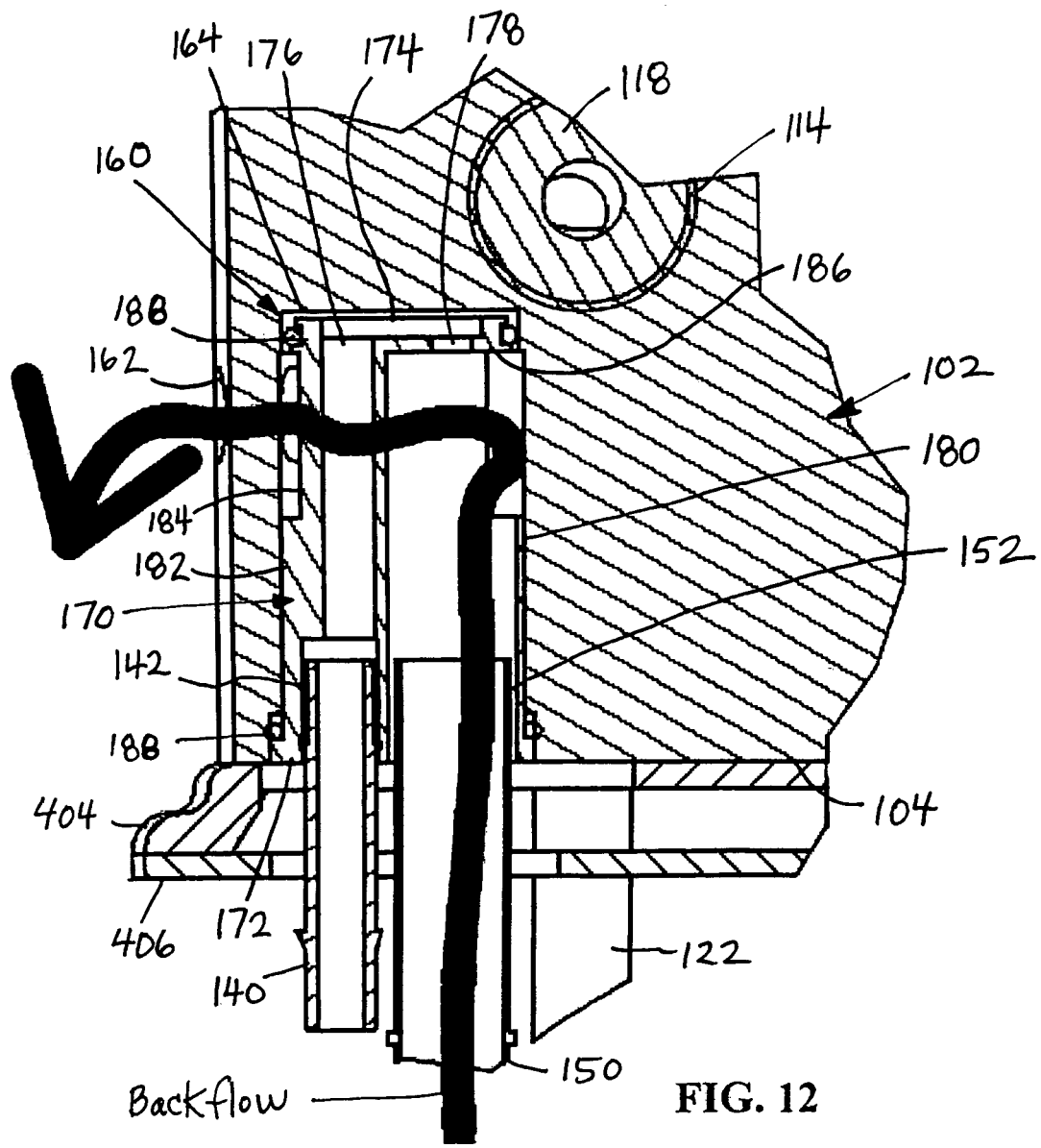
FIG. 12 a further enlarged view of a portion of the faucet assembly contained in circle 12 of FIG. 11, wherein an arrow is provided to illustrate reverse flow of backed-up drain water through the air gap assembly of the faucet assembly.

As shown best in FIGS. 10-12, the base 102 also has an air gap bore 160 extending from the first end 104, and an air gap port 162 extending from the sidewall 108 to the air gap bore 160. An air gap holder 170 is received in the air gap bore 160, and includes a first end 172 having a concentrate water inlet port 142 and a wastewater outlet port 152. The concentrate water inlet tube 140 is received in the concentrate water inlet port 142 of the air gap holder 170, and the wastewater outlet tube 150 is received in the wastewater outlet port 152 of the air gap holder 170 below the air gap port 162. In operation, concentrate water from the concentrate water inlet tube 140 is directed to an end 164 of the air gap bore 160 above the air gap port 162 and then allowed to flow to the waste water outlet tube 150, as illustrated by arrow "Normal Flow" in FIG. 11. During backflow operation (when there is a blockage in connected drain pipes, for example), wastewater from the wastewater outlet tube 150 is directed out the air gap port 162 and out of the faucet assembly 100, as illustrated by arrow "Backflow" in FIG. 12, and is prevented from going back to the concentrate water inlet port 142. Among other advantages, this air gap arrangement can be inexpensively manufactured and easily assembled. In addition, the air gap arrangement has been found to provide relatively quiet operation when the concentrate water is normally drained to the wastewater outlet tube 150. The wastewater outlet tube 150 has a greater cross-section than the concentrate water inlet tube 140 to further prevent backflow into the concentrate water inlet tube 140.

Figures 13, 14:
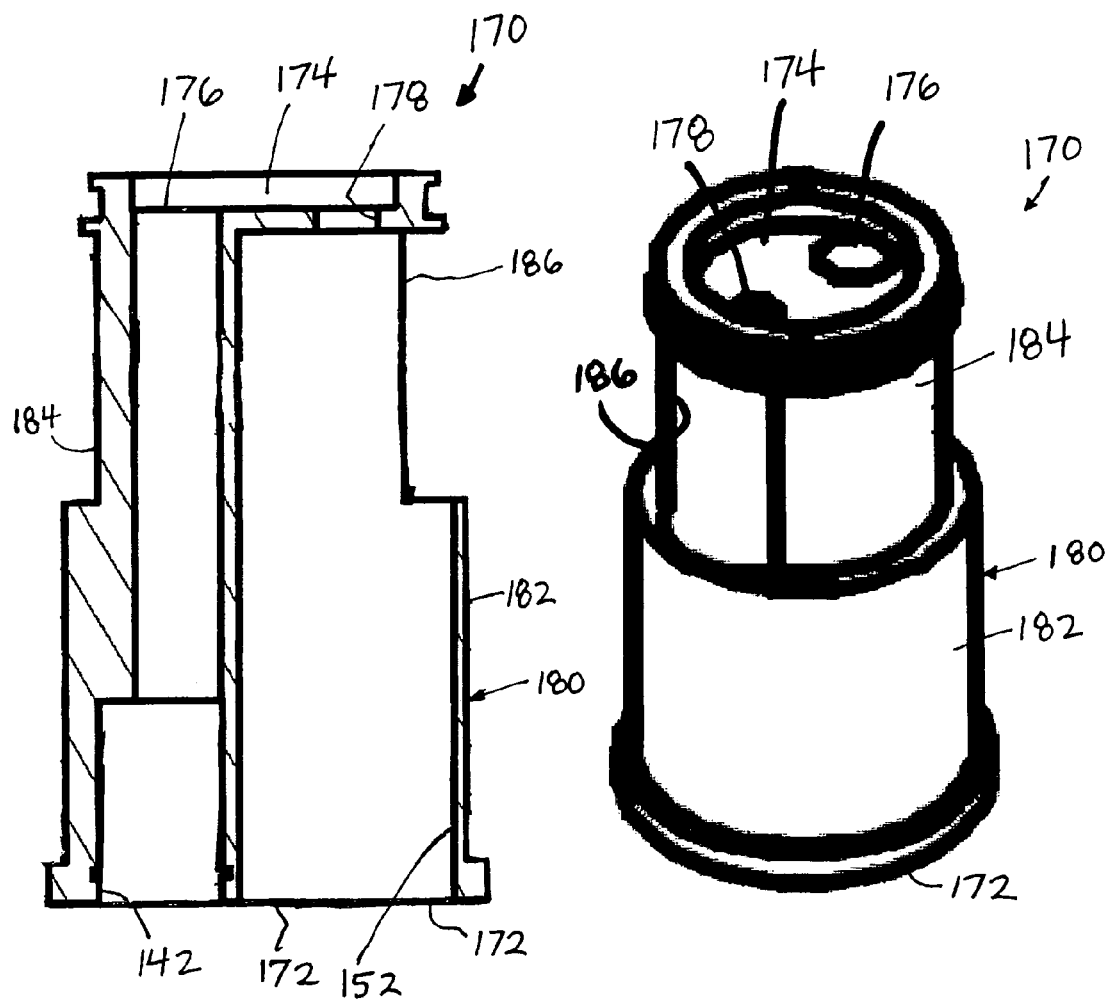
FIG. 13 is an enlarged sectional view of a holder of the air gap assembly of the faucet assembly of FIG. 1.
FIG. 14 is an enlarged perspective view of the holder of the air gap assembly of the faucet assembly of FIG. 1.

As also shown in FIGS. 13-14, the exemplary embodiment of the air gap holder 170 further includes a closed second end forming a cup 174 having a cup inlet 176 connected to the concentrate water inlet port 142 and a cup outlet 178 connected to the wastewater outlet port 152. A sidewall 180 extends upwardly from the first end 172 to the second end 174 and includes a lower portion 182 having an outer diameter substantially equal to an inner diameter of the air gap bore 160 and an upper portion 184 having an outer diameter less than the inner diameter of the air gap bore 160. The upper portion 184 of the sidewall 180 has a wastewater backflow door 186 located below the cup outlet 178, and an end of the wastewater outlet tube 150 is positioned below the wastewater backflow door 186 of the air gap holder 170. The air gap holder 170 is arranged so that the wastewater backflow door 186 faces away from the air gap port 162. Thus, during normal operation the sound of concentrate water falling from the cup outlet 178 to the wastewater outlet tube 150 does not travel directly out of the air gap port 162 but is baffled by the upper portion 184 of the sidewall 180, thereby reducing noise during normal operation. O-rings 188, as best shown in FIGS. 2, 11-12, are provided to seal the air gap holder 170 in the base 102.

FIGS. 15-17 show a second exemplary embodiment of a faucet assembly 200 constructed in accordance with the present disclosure. The faucet assembly 200 of FIGS. 15-17 is similar to the faucet assembly 100 of FIGS. 1-14 such that similar elements are provided with the same reference character. In the faucet assembly 200 of FIGS. 15-17 an air gap bore 260 includes a concentrate water portion 266 and a wastewater portion 268, the concentrate water portion 266 extending further from the first end 104 than the wastewater portion 268, and the air gap port 162 extends to the wastewater portion 268 of the air gap bore 260. A concentrate water inlet port 242 of an air gap holder 270 is aligned with the concentrate water portion 266 of the air gap bore 260 and a wastewater outlet port 252 of the air gap holder 270 is aligned with the wastewater portion 268 of the air gap bore 260. The concentrate water inlet tube 140 has an end extending into the concentrate water portion 266 of the air gap bore 260 to an end 264 of the air gap bore, above the wastewater portion 268 of the air gap bore and above the air gap port 162. In operation, concentrate water from the concentrate water inlet tube 140 is directed to the end 264 of the concentrate water portion 266 of the air gap bore 260 above the air gap port 162, and then allowed to flow down to the wastewater portion 268 and to the wastewater outlet tube 150, as illustrated by arrow "Normal" in FIG. 17. Although not shown, any backflow from the wastewater outlet tube 150 simple exits the faucet assembly 200 through the air gap port 162 before it rises to the end 264 of the concentrate water portion 266 of the air gap bore 260.

FIGS. 18-20 show a third exemplary embodiment of a faucet assembly 300 constructed in accordance with the present disclosure. The faucet assembly 300 of FIGS. 18-20 is similar to the faucet assembly 100 of FIGS. 1-14 such that similar elements are provided with the same reference character. In the faucet assembly 300 of FIGS. 18-20 a base 302 includes a permeate water inlet port 332 having annular ribs 334. As shown best in FIG. 20, the ribs 334 have sloping sidewalls 336 terminating at radial end walls 338 to form pointed barbs that frictionally engage the permeate inlet tube 130 when inserted into the port 332. The sloping sidewalls 336 extend inwardly into the base 302 at an angle "α" of about 7° with respect to an axis "A" of the port 332. Among other advantages, the ribs 334 provide a strong and secure seal between the port 332 and the tube 130, without requiring a separate sealant or glue, yet is relatively inexpensive to manufacture and easy to assembly. According to one exemplary embodiment, the permeate water inlet tube 130 that is inserted into the port 332 is made from polypropylene.

In the exemplary embodiment shown, the permeate water inlet port 332 of the base 302 includes a first portion 332a defining the ribs 334 and a second portion 332b connecting the first portion 332a to the valve assembly bore 114. A cross-section of the second portion 332b is smaller than a cross-section of the first portion 332a. This arrangement allows the cross-section of the permeate water flow path to remain substantially constant as it passes from the tube 130 to the port 332.

Referring back to FIG. 2, additional parts of the exemplary embodiment of the faucet assemblies include a faucet spout and o-rings, and a base plate and a gasket. A gasket and an o-ring are provided for the toggle bolt. In addition to the valve member, a valve assembly of the faucet assembly includes a spring, a slide seal, a seal, an o-ring, a bushing, a nut, and a handle.

The present disclosure, therefore, provides a new and improved top mounted faucet assembly having an air gap for use with a reverse osmosis water filtering system. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the faucet assembly disclosed herein, and all elements thereof, is contained within the scope of at least one of the following claims. No elements of the presently disclosed faucet assembly are meant to be disclaimed.

What is claimed is:

1. A faucet assembly comprising:
    a base including,
        opposing first and second ends,
        a sidewall extending between the ends,
        a mounting bore extending upwardly from the first end into the base,
        a permeate water spout port extending upwardly from within the base to the second end of the base, wherein the mounting bore and the permeate water spout port are aligned,
        a valve assembly bore extending into the base from the sidewall and connecting the mounting bore and the permeate water spout port;
    a fastener including a head located within the mounting bore and a body extending out of the base from the mounting bore for securing the faucet assembly to a mounting surface; and
    a valve member positioned within the valve assembly bore and movable between closed and opened positions, wherein the valve member allows tool access from the permeate water spout port, through the valve member, and to the head of the fastener in the mounting bore when the valve member is moved to a predetermined position.

2. A faucet assembly according to claim 1, wherein the predetermined position of the valve member corresponds to the closed position of the valve member.

3. A faucet assembly according to claim 1, further comprising a toggle nut assembly secured to the body of the fastener.

4. A faucet assembly according to claim 1, wherein the permeate water spout port, the valve member, and the mounting bore are adapted to allow a tool comprising a screwdriver to access the head of the fastener.

5. A faucet assembly according to claim 1, wherein the base further comprises a permeate water inlet port extending from the first end and connected to the valve assembly bore, wherein fluid communication is provided between the permeate water inlet port and the permeate water spout port when the valve member is moved to the opened position.

6. A faucet assembly according to claim 1, wherein the permeate water inlet port includes annular ribs comprising sloping sidewalls terminating at radial end walls to form pointed barbs, and wherein the sloping sidewalls extends inwardly at an angle of about 7° with respect to an axis of the port.

7. A faucet assembly according to claim 1, wherein the base further comprises an air gap bore extending from the first end and an air gap port extending from the sidewall to the air gap bore and the faucet assembly further comprises:
    an air gap holder received in the air gap bore, the air gap holder including,
        a first end having a concentrate water inlet port and a wastewater outlet port,
        a closed second end forming a cup having a cup inlet connected to the concentrate water inlet port and a cup outlet connected to the wastewater outlet port, and
        a sidewall extending upwardly from the first end to the second end and including a lower portion having an outer diameter substantially equal to an inner diameter of the air gap bore and an upper portion having an outer diameter less than the inner diameter of the air gap bore, the upper portion of the sidewall having a wastewater backflow door located below the cup outlet;
    a concentrate water inlet tube received in the concentrate water inlet port of the air gap holder; and
    a wastewater outlet tube received in the wastewater outlet port of the air gap holder below the wastewater backflow door of the air gap holder.

8. A faucet assembly according to claim 1, wherein the base further comprises an air gap bore extending from the first end and including a concentrate water portion and a wastewater portion, the concentrate water portion extending further from the first end than the wastewater portion, and an air gap port extending from the sidewall to the wastewater portion of the air gap bore, and wherein the faucet assembly further comprises:
    an air gap holder received in the air gap bore, the air gap holder including a concentrate water inlet port aligned with the concentrate water portion of the air gap bore and a wastewater outlet port aligned with the wastewater portion of the air gap bore;
    a concentrate water inlet tube received in the concentrate water inlet port of the air gap holder and having an end extending into the concentrate water portion of the air gap bore and positioned above the wastewater portion of the air gap bore; and
    a wastewater outlet tube received in the wastewater outlet port of the air gap holder below the air gap port.

9. A reverse osmosis water filtering system including a faucet assembly according to claim 1, wherein the faucet assembly includes a permeate water inlet port and a concentrate water inlet port, and the filtering system further comprises:

a reverse osmosis membrane having a permeate water output port connected to the permeate water inlet port of the faucet assembly, and a concentrate water output port connected to the concentrate water inlet port of the faucet assembly.

10. A faucet assembly comprising:

a base including a mounting bore and a permeate water spout port, and a valve assembly bore, wherein the mounting bore, the permeate water spout port, and the valve assembly bore intersect, a fastener extending out of the base from the mounting bore for securing the faucet assembly to a mounting surface; and a valve member positioned within the valve assembly bore and movable to allow tool access from the permeate water spout port, through the valve member, and to the fastener in the mounting bore.

11. A faucet assembly according to claim 10, further comprising a toggle nut assembly secured to the fastener.

12. A faucet assembly according to claim 10, wherein the base further comprises a permeate water inlet port connected to the valve assembly bore, wherein fluid communication is provided between the permeate water inlet port and the permeate water spout port when the valve member is moved to an opened position.

13. A faucet assembly according to claim 10, wherein the base further comprises an air gap bore and an air gap port intersecting the air gap bore and the faucet assembly further comprises a concentrate water inlet tube and a wastewater outlet tube received in the air gap bore, wherein the concentrate water inlet tube extends to above the air gap port and the wastewater outlet tube extends to below the air gap port.

14. A faucet assembly according to claim 10, wherein the base further comprises an air gap bore including a concentrate water portion and a wastewater portion, the concentrate water portion extending further into the base than the wastewater portion, and an air gap port intersecting the wastewater portion of the air gap bore, and wherein the faucet assembly further comprises:

an air gap holder received in the air gap bore, the air gap holder including a concentrate water inlet port aligned with the concentrate water portion of the air gap bore and a wastewater outlet port aligned with the wastewater portion of the air gap bore;

a concentrate water inlet tube received in the concentrate water inlet port of the air gap holder and having an end extending into the concentrate water portion of the air gap bore to above the wastewater portion of the air gap bore; and a wastewater outlet tube received in the wastewater outlet port of the air gap holder below the air gap port.

15. A faucet assembly according to claim 10, wherein the base further comprises an air gap bore and an air gap port intersecting the air gap bore, and the faucet assembly further comprises:

an air gap holder received in the air gap bore, the air gap holder including, a first end having a concentrate water inlet port and a wastewater outlet port, a closed second end forming a cup having a cup inlet connected to the concentrate water inlet port and a cup outlet connected to the wastewater outlet port, and a sidewall extending upwardly from the first end to the second end and including a lower portion having an outer diameter substantially equal to an inner diameter of the air gap bore and an upper portion having an outer diameter less than the inner diameter of the air gap bore, the upper portion of the sidewall having a wastewater backflow door located below the cup outlet;

a concentrate water inlet tube received in the concentrate water inlet port of the air gap holder; and a wastewater outlet tube received in the wastewater outlet port of the air gap holder below the wastewater backflow door of the air gap holder.

* * * * *